United States Patent [19]

Berg et al.

[11] 4,139,277

[45] Feb. 13, 1979

[54] ACOUSTO-OPTIC MEMORY CORRELATOR

[75] Inventors: Norman J. Berg, Baltimore, Md.; Bob L. Smith, deceased, late of Huntsville, Ala., by Allen B. Adams, legal representative, Cupertino, Calif.

[73] Assignee: The United States of America as represented by the Secretary of the Army, Washington, D.C.

[21] Appl. No.: 804,206

[22] Filed: Jun. 7, 1977

[51] Int. Cl.² .............................................. G02F 1/11
[52] U.S. Cl. ................................................... 350/358
[58] Field of Search ....................... 350/358; 96/13, 14

[56] References Cited

U.S. PATENT DOCUMENTS 3,919,700  11/1975  Cozzo et al. ........................... 350/358

Primary Examiner—William L. Sikes

Attorney, Agent, or Firm—Nathan Edelberg; Robert P. Gibson; Saul Elbaum

[57] ABSTRACT

An apparatus for performing the correlation of a real-time signal, and a stored signal or signals, and two methods of storing signals as index of refraction variation patterns in piezoelectric crystals. A modulated R.F. signal is stored in a piezoelectric crystal by converting the signal to an acoustic signal which is then propagated across the length of the crystal. A portion of the surface of the crystal is irradiated by a high-frequency, short-duration laser pulse, and the acoustic signal is stored as a variable index of refraction pattern at the irradiated areas. When a real-time signal is propagated across the stored signal, and the surface of the crystal is irradiated with a laser beam, the correlation of the real-time signal and the stored signal is obtained upon demodulation of the laser beam.

6 Claims, 4 Drawing Figures

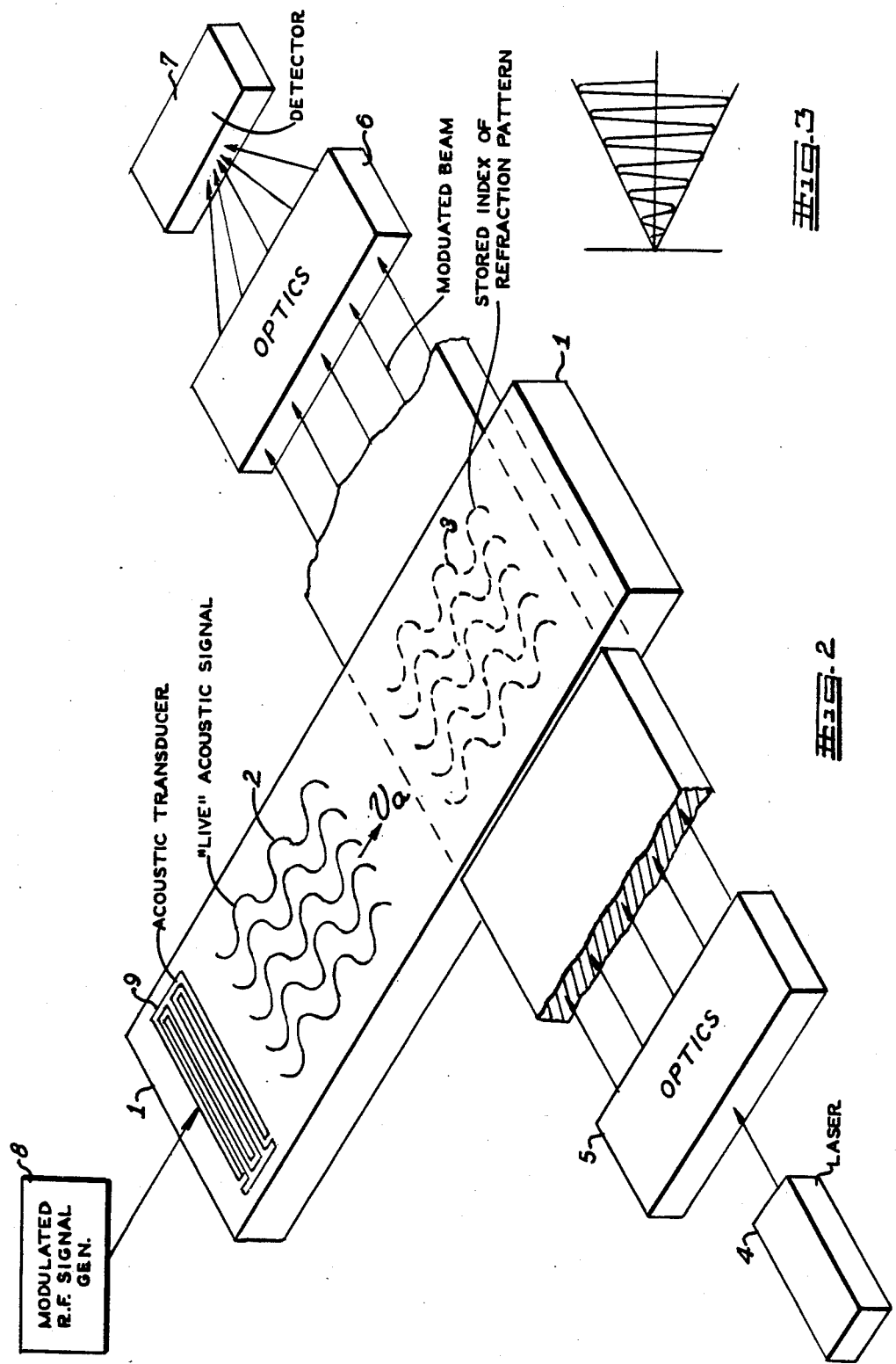

ACOUSTO-OPTIC MEMORY CORRELATOR

RIGHTS OF THE GOVERNMENT

The invention described herein may be manufactured, used, and licensed by or for the United States Government for governmental purposes without the payment to us of any royalty thereon.

The present invention is directed to an apparatus for performing the correlation of a real-time input signal and a stored signal or signals, and further is directed to methods of storing signals as index of refraction variation patterns in piezoelectric crystals.

Reference will be made in the specification of Application Ser. No. 804,203, filed on June 7, 1977, which, along with this application, is assigned to the U.S. Government.

Co-pending application Ser. No. 804,203 is directed to a high-performance acousto-optic correlator device for performing the correlation of two real-time input signals. In some applications, however, it is advantageous to correlate a real-time input signal with a stored signal or a plurality of stored signals, and it is towards this objective that the present invention is directed.

It is therefore an object of the invention to provide an apparatus and device for performing the correlation of a real-time input signal and a stored signal or signals.

It is a further object of the invention to provide a correlation device having a large time-bandwidth product, a large dynamic range, and a high degree of isolation between the input and the output.

It is still a further object of the invention to provide a relatively small device which is capable of storing an extremely large number of signals, which are available for scanning and correlation with a selected input signal.

It is still a further object of the invention to provide two methods of storing signals in crystals as spatially varying index of refraction patterns.

The invention will be better understood by referring to the accompanying drawings, in which:

FIG. 2 is a diagrammatic illustration of the memory correlator device of the invention;

FIG. 3 is a representative waveform which could be applied to the acoustic transducer of the memory correlator device of the invention.

The correlator device of the present invention employs an acousto-optic phenomenon to modulate a light beam in accordance with the correlation of two signals. More specifically, the light beam is modulated by the combination of spatial change in the index of refraction caused by a propagating acoustic wave and a "stored wave" in a piezoelectric crystal.

By way of background, diffraction of light by high frequency sound waves, called Brillouin scattering, was first observed in 1932. The development of the laser and advances in high frequency techniques have increased the practical potential of the acousto-optical interaction phenomenon.

An acoustic wave propagating in a medium causes a spatial change in the index of refraction of the medium as a result of the acoustic strain s according to the relationship:

$$\Delta n = (-n^3 ps)/2$$

where
n = index of refraction
p = electro-optic coefficient.

A light beam impinging on the acoustic wave is scattered as a result of this index of refraction variation just as if it encountered a diffraction grating. Since the acoustic wave is propagating and momentum must be conserved, the frequency of the light wave is shifted by an amount equal to the acoustic frequency.

Figure 1:
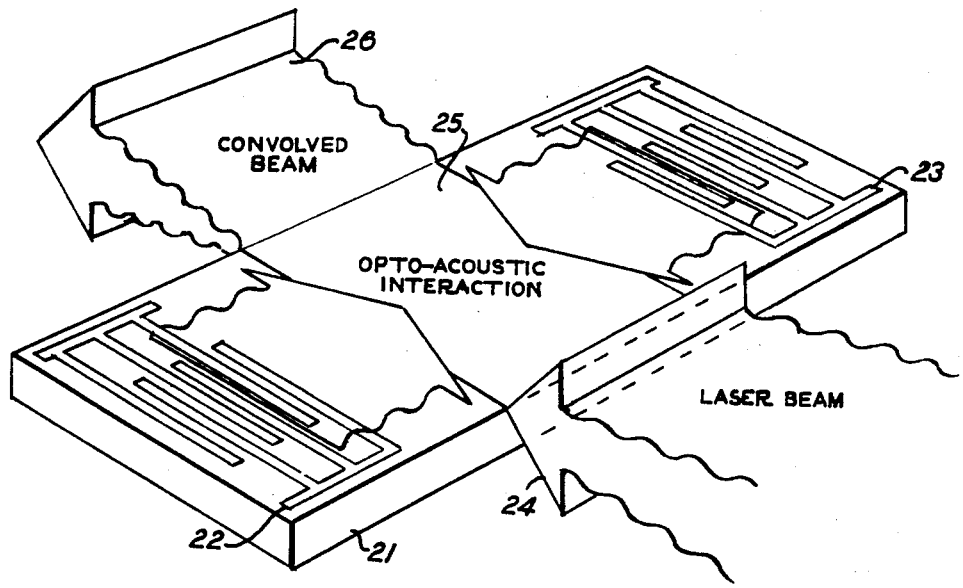
FIG. 1 is a prior art acousto-optic convolver device useful in explaining the background of the present invention.

The principles of operation of the memory correlator of the present invention are best understood by first referring to FIG. 1, which is an illustration of an acousto-optic convolver, such as is known to the prior art.

The body of the convolver is an elongated sheet of piezoelectric crystal 21, such as lithium niobate. At respective ends of the crystal, acoustic transducers 21 and 23 are disposed, and such transducers are known means for converting an electrical signal to a corresponding acoustic wave. A laser such as a helium-neon laser, is arranged to direct a light beam across the top part of the crystal as shown in FIG. 1.

An electrical signal of the form $A(t)\cos w_1 t$ is applied to transducer 21 and a signal of the form $B(t)\cos w_1 t$ is applied to transducer 23 where $w_1$ is an R.F. frequency signal which is amplitude modulated by the envelopes $A(t)$ and $B(t)$ where $A(t)$ and $B(t)$ are the signals which are to be convolved with each other. The acoustic waves launched by the respective transducers cross each other in the middle area of the crystal. The light beam, which can be represented by $I_0 \cos Wt$ traverses the surface of the crystal in the middle area and is diffracted by the acoustic waves. The intensity of the diffracted light beam is of the form $$K^2 I_0 (A(t) B(t) \cos (W - 2w_1)t.$$

This doubly diffracted light beam is focussed on a square-law detector diode and the diode output voltage at double the acoustic frequency is $$V_{out} \sim A(t)B(t)\cos(2w_1).$$

If $A(t)$ and $B(t)$ are pulses whose widths are shorter than the interaction region encompassed by the light beam in FIG. 1, then the focussing process is equivalent to an integration with respect to time. Since the two waves are passing each other, the output varies with respect to a delay time T where T varies from zero, when both pulses overlap, to some maximum value determined by the length of the interaction region. For the conditions described, the output voltage as a function of time is given by $$V_0(T) = \int_{-\infty}^{+\infty} A(t)B(t-T)dt,$$

which is equivalent to the convolution of $A(t)$ and $B(t)$.

As is known, it is frequently more useful to obtain the correlation instead of the convolution of two signals. The correlation is defined as $$V_o(T) = \int_{-\infty}^{+\infty} A(t)B(t+T)dt$$

and as can intuitively be understood on the basis of the above discussion, if one acoustic wave is slowly "slid" past the other wave while travelling in the crystal in the same direction, the correlation of the two waves is obtained.

It is only necessary that one wave travel slowly enough with respect to the other wave so that the faster wave can slide entirely past the slower wave within the length of the crystal. In co-pending Application Ser. No. 804,203 an arrangement was disclosed in which two crystals having different acoustic velocities were utilized and both waves were generated in real time, with the faster wave sliding past the slower wave. According to the memory correlator of the present invention, one wave is stored in the crystal and the wave generated in real time slides past the stored wave to effect the correlation.

The methods provided by the invention for storing signals in piezoelectric crystals will now be discussed.

As mentioned above, the interaction of the light beam with the acoustic wave is a direct result of the spatial change in index of refraction which the acoustic wave produces as a result of the acoustic strain s, where $$\Delta n = (-n^3 ps)/2$$

According to the invention, a method is provided for storing in the piezoelectric material a spatial variation in an index of refraction pattern which corresponds to an acoustic wave. Then, correlation can proceed with the stored wave just as with the original wave.

In the prior art, it has been demonstrated that holographic images, caused by changes in the index of refraction of the material can be stored in lithium niobate by exposure to 0.53 micron laser radiation. According to the present invention, intense laser radiation is used to "freeze" a wave, and store it semi-permanently in the crystal.

Figure 4:
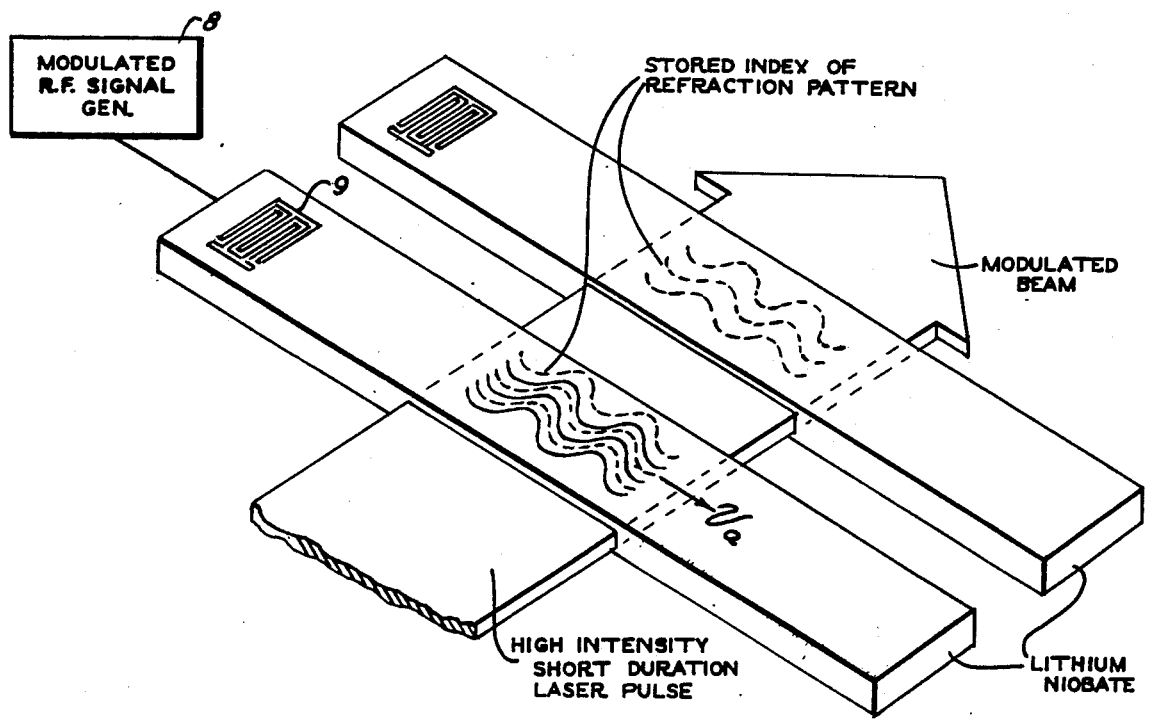
FIG. 4 illustrates the methods provided by the invention for storing signals as index of refraction patterns in piezoelectric crystals.

The methods for storing the desired signal are illustrated in FIG. 4. The signals of interest are modulated R.F. signals, the envelope of the composite signal being the signal to be correlated. A representative signal is shown in FIG. 3, wherein the envelope of the composite signal is a rising ramp. As recognized by those skilled in the art, the envelope may be any desired waveshape.

The modulated R.F. signal is generated by generator 8 in FIG. 4, which can for instance be a frequency synthesizer which is switched on and off by a pulse generator. The signal is applied to acoustic transducer 9, the exact form of which is known to those skilled in the art, and which converts the electrical signal to an acoustic signal which is propagated across the length of lithium niobate crystal 1. At a selected area of the crystal, a spatially-wide, high-intensity, short-duration laser pulse at 0.53 microns is directed across the surface of the crystal. This effectively "freezes" the propagating waveform in the irradiated area as a spatially varying index of refraction pattern. To accomplish this, the laser pulse must be short compared to the width of an R.F. cycle, and in an illustrative embodiment, the pulse width was approximately 10% of the width of an R.F. cycle. Thus, if the R.F. signal to be stored is at a frequency of 10 MHz, the pulse duration would be 10 ns, and the laser beam, by way of example, could have an intensity of approximately 1 J/cm². The 0.53 micron radiation is second harmonic radiation obtained from a 1.06 micron output laser. If the 0.53 micron second harmonic and the 1.06 micron fundamental are utilized simultaneously, a factor of 3 enhancement in the index of refraction change results.

The physical basis for the index of refraction change is believed to be the photocarriers produced by the laser beam. Regions of the material which have a higher density will therefore produce more photocarriers and hence result in larger $\Delta n$. The propagating acoustic wave varies the density, since the dilation $\Delta \rho/\rho$ is equal to the strain s. That is to say, that for the small perturbations with which we are dealing, the nonlinear $\Delta n$ variation resulting from exposure to the high-intensity second harmonic pulse should be proportional to $\Delta \rho/\rho$. So, if we cause an acoustic wave to propagate in LiNbO₃ and then expose this to a high-intensity short-duration SH beam, a pattern of spatial variation in $\Delta n$ should result corresponding to the original acoustic signal. Therefore:

$$\Delta n \: J^2 \: s/\tau,$$

where
J = energy density in Joules/cm²
$\tau$ = laser pulse width in nanoseconds.

The magnitude of the strain s is given by:

$$s \sim \sqrt{\frac{2P_s}{\rho v^3}}$$

where
$P_s$ = the acoustic power density in erg-sec/cm²,
$\rho$ = density = 4.64 g/cm²(LiNbO₃), and
v = acoustic velocity $3.5 \times 10^5$ cm/sec(LiNbO₃).

The maximum acoustic power density which we can utilize is determined by the onset of nonlinearity in the piezoelectric material, i.e., exceeding the Hooke's Law regime of operation. For LiNbO₃ this maximum power density is given by $$P_{sm} = 80 \sqrt{F} \text{ (watts/cm}^2\text{)}$$

where F is the frequency in MHz.

Combining the above equations, and substituting numerical values yields:

$$\Delta n = 2.7 \times 10^{-8} \times J^2 \tau^{-1} (F)^{\frac{1}{4}},$$

where the factor of 3 enhancement obtained by simultaneous 1.06 micron irradiation has been included. This value for $\Delta n$ assumes that a single pulse has been used. With correct timing many pulses can be utilized, therefore:

$$\Delta n = 2.7 \times 10^{-8} \times \frac{N J^2}{\tau} (F)^{\frac{1}{4}},$$

where N = number of pulses.

$$\Delta n = 2.7 \times 10^{-7} \times \frac{N J^2}{(\tau)^{5/4}}$$

is the maximum change in index of refraction for a given laser pulse width.

Referring to FIG. 4, a second method is illustrated for storing the acoustic wave in a crystal. This method is the same as the first method except that the modulated beam after it traverses the surface of the crystal, is made incident on a second lithium niobate crystal. This has the effect of storing the index of refraction pattern in the second crystal, and the pattern which is stored will be approximately 100 times stronger than the pattern which is stored in the first crystal.

The limitations on the density of stored signals via the above processes are the inherent resolution (4000 lines/mm and the availability of very short pulse-width lasers. Mode-locked neodymium/glass lasers have a pulse width of 10 ps. This together with the observed resolution implies that acoustic signals up to 10 GHz can be stored. Surface acoustic wave technology is presently limited to a few gigahertz, however. If we assume a frequency maximum of 2 GHz and a half cycle as the smallest storable signal, the density of stored images at this frequency would be 10,000 per cm length of $LiNbO_3$. The attenuation of SAW at this frequency is about 10 dB per cm. If we assume that the dynamic range of the acousto-optic correlation is about 60 dB and that we wish to maintain about 30 dB of signal range, we would be limited to about 3 cm or 30,000 stored images. All of these stored images could be scanned and a correlation to any one of them obtained in less than 10 microseconds, which indicates the tremendous potential of the storage device.

If a signal is stored in a crystal according to one of the two above methods, and a second real time signal is then propagated across the crystal so that it "slides" past the stored signal, the correlation of the two signals may be obtained.

Thus, the stored pattern will modulate the laser beam according to $P_s(t)_{stored}$, where the t variable corresponds to the amplitude variation across the length of the signal. The real time signal propagating across the crystal modulates the laser beam according to $P_s(t+T)_{real\ time}$, where T corresponds to the delay time necessary for the second signal to cross the first signal. The resultant modulated light is hence proportional to the product $P_s(t)_{stored} \times P_s(t+T)_{real\ time}$. If the light is then focussed using a spherical lens onto a PIN square-law photodetector diode, the output is proportional to:

$$\int P_s(t)_{stored} \times P_s(t+T)_{real\ time}\, dt$$

which is the correlation of the two signals.

FIG. 2 shows the arrangement for obtaining the correlation of a real time signal with the stored signal. Crystal 1 has an index of refraction pattern stored therein as shown, and the real time signal, which would be at the same acoustic or R.F. frequency is provided by Modulated R.F. signal Generator 8. The real time wave is launched by acoustic transducer 9, and is propagated across the stored pattern. A laser beam is directed across the crystal at the area of the stored pattern, and is modulated by the two waves. It is then focussed on square law detector 9, and the output at the acoustic frequency corresponds to the desired correlation. In an actual set-up, a filter at the acoustic frequency would be utilized in the detector circuit.

Optics 5 is an optical configuration, known to those skilled in the art, for providing a wide, thin beam which enters and leaves the acoustic medium approximately perpendicular to the propagating wave. For instance, optics 5 may be comprised of spherical beam expanding lenses followed by cylindrical lenses which expand the beam in the horizontal direction, and focus it in the region of the acoustic medium. Optics 6, which follow the acoustic medium, may be comprised of a cylindrical lens for re-collimating the light and a spherical lens for focussing it on the square law photodetector.

We wish it to be understood that we do not desire to be limited to the exact details of construction shown and described, for obvious modifications can be made by a person skilled in the art.

It is claimed:

1. An acousto-optic apparatus for providing the correlation of a first signal and a stored signal, comprising,
    an acousto-optic interaction medium having said stored signal stored therein as a spatially varying index of refraction pattern,
    said medium having an acoustic transducer means for converting an electrical signal to an acoustic signal disposed thereon to one side of said spatially varying index of refraction pattern,
    means for applying a high-frequency A.C. signal to said transducer means, said signal having an envelope corresponding to said first signal,
    laser means directed to transmit a laser beam across said medium at the area of said stored index of refraction pattern and across the path of said acoustic signal in said medium, and
    detector means for detecting said laser beam after it traverses said acousto-optic interaction medium,
    whereby said detector means produces a signal representative of the correlation of said first signal and said stored signal.

2. The apparatus of claim 1 wherein said acousto-optic interaction medium is lithium niobate.

3. A method of storing a spatially varying index of refraction pattern in a lithium niobate crystal, which pattern corresponds to a selected electrical signal, comprising the steps of,
    providing a high-frequency A.C. electrical signal which is modulated by said selected electrical signal,
    converting said modulated signal to a corresponding acoustic signal,
    causing said acoustic signal to traverse said crystal at at least the surface thereof, in a first direction, and
    irradiating a portion of said crystal with a laser light pulse at at least the surface thereof in a direction approximately perpendicular to said first direction at a time when said acoustic signal is at said portion of said crystal, said laser light pulse being short compared to the duration of one A.C. cycle of said high-frequency A.C. signal.

4. The method of claim 3 wherein said crystal is a first crystal, further including the steps of
    irradiating a portion of a second lithium niobate crystal at at least the surface thereof with said laser light pulse after it traverses said first crystal, whereby a spatially varying index of refraction pattern is stored in said second crystal.

5. The method of claim 3 wherein said laser light pulse is at a wavelength of 0.53 microns.

6. The method of claim 3 wherein said laser light pulse is at wavelengths of 0.53 microns and 1.06 microns.

* * * * *